US009620267B2

(12) United States Patent
Tsuda et al.

(10) Patent No.: US 9,620,267 B2
(45) Date of Patent: Apr. 11, 2017

(54) RESISTOR AND MANUFACTURING METHOD FOR SAME

(71) Applicant: Panasonic Intellectual Property Management Co., Ltd., Osaka (JP)

(72) Inventors: Seiji Tsuda, Fukui (JP); Shoji Hoshitoku, Fukui (JP); Takeshi Iseki, Nara (JP); Kazutosi Matumura, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 14/407,990

(22) PCT Filed: Apr. 1, 2014

(86) PCT No.: PCT/JP2014/001904
§ 371 (c)(1),
(2) Date: Dec. 15, 2014

(87) PCT Pub. No.: WO2014/171087
PCT Pub. Date: Oct. 23, 2014

(65) Prior Publication Data

US 2015/0129108 A1 May 14, 2015

(30) Foreign Application Priority Data

Apr. 18, 2013 (JP) ................................ 2013-087159
Apr. 25, 2013 (JP) ................................ 2013-092346

(51) Int. Cl.
*B32B 41/00* (2006.01)
*H01C 17/28* (2006.01)
(Continued)

(52) U.S. Cl.
CPC .......... *H01C 17/281* (2013.01); *H01C 17/06* (2013.01); *H01C 17/24* (2013.01); *H01C 17/30* (2013.01)

(58) Field of Classification Search
CPC ...... H01C 17/281; H01C 17/30; H01C 17/06; H01C 17/24
(Continued)

(56) References Cited

U.S. PATENT DOCUMENTS

2005/0266615 A1 12/2005 Tsukada
2008/0272879 A1 11/2008 Tsukada
(Continued)

FOREIGN PATENT DOCUMENTS

EP 841668 5/1998
JP 1-289201 11/1989
(Continued)

OTHER PUBLICATIONS

International Search Report of PCT application No. PCT/JP2014/001904 dated Jul. 1, 2014.

*Primary Examiner* — Michael N Orlando
*Assistant Examiner* — Joshel Rivera
(74) *Attorney, Agent, or Firm* — Wenderoth, Lind & Ponack, L.L.P.

(57) ABSTRACT

In a method of manufacturing a resistor, a sheet-shaped resistive element having formed thereon a plurality of belt-shaped electrodes is cut in a direction crossing these belt-shaped electrodes to produce strip-shaped resistive elements. On the other hand, a metal paste containing a glass frit is printed in a pattern of belts arranged at regular intervals on a surface of a plate-shaped insulating substrate to form a plurality of adhesive layers. Then, the strip-shaped resistive elements are respectively applied to the adhesive layers on the plate-shaped insulating substrate, and these are
(Continued)

fired in a nitrogen atmosphere. After firing, while a resistance value of a part between each adjacent two electrodes of each strip-shaped resistive element is measured, the strip-shaped resistive element is trimmed so that the resistance value becomes a predetermined value. Then, the plate-shaped insulating substrate having adhered thereto the strip-shaped resistive elements is divided into pieces.

14 Claims, 9 Drawing Sheets

(51) Int. Cl.

| | |
|---|---|
| ***H01C 17/06*** | (2006.01) |
| ***H01C 17/24*** | (2006.01) |
| ***H01C 17/30*** | (2006.01) |

(58) Field of Classification Search

USPC .......... 156/64, 350, 351, 378, 379; 338/314; 216/11

See application file for complete search history.

(56) References Cited

U.S. PATENT DOCUMENTS

| | | | | |
|---|---|---|---|---|
| 2009/0284342 | A1 | 11/2009 | Tsukada | |
| 2010/0269893 | A1 * | 10/2010 | Prince .................. | B23K 1/0016 136/252 |

FOREIGN PATENT DOCUMENTS

| | | |
|---|---|---|
| JP | 9-275002 | 10/1997 |
| JP | 10-135014 | 5/1998 |
| JP | 10-149901 | 6/1998 |
| JP | 2002-050865 | 2/2002 |
| JP | 2004-063503 | 2/2004 |
| JP | 2007-220859 | 8/2007 |
| JP | 2009-302494 | 12/2009 |

* cited by examiner

RESISTOR AND MANUFACTURING METHOD FOR SAME

TECHNICAL FIELD

The present invention relates to a resistor including a metal plate (metal foil) as a resistive element and a method of manufacturing the resistor.

BACKGROUND ART

A conventional method of manufacturing a resistor including a metal plate as a resistive element will be described with reference to FIGS. 11A and 11B. FIGS. 11A and 11B are perspective views for explaining the method of manufacturing a conventional resistor. First, as shown in FIG. 11A, a plurality of belt-shaped insulating films 2 are formed at regular intervals on an upper surface of sheet-shaped resistive element 1 composed of a metal. Then, as shown in FIG. 11B, sheet-shaped resistive element 1 is plated on the parts exposed between the plurality of belt-shaped insulating films 2 to form a plurality of belt-shaped electrodes 3. Then, the intermediate product shown in FIG. 11B is divided into pieces of resistors (see, for example, Patent Literature PTL1).

CITATION LIST

Patent Literature

PTL 1: Unexamined Japanese Patent Publication No. 2004-63503

SUMMARY OF THE INVENTION

In a first method of manufacturing a resistor according to the present invention, a metal paste is printed on a plurality of belt-shaped parts spaced apart from one another on a surface of a sheet-shaped resistive element, and fired to form a plurality of belt-shaped electrodes spaced apart from one another. Next, the sheet-shaped resistive element having formed thereon the plurality of belt-shaped electrodes is cut in a direction crossing the plurality of belt-shaped electrodes, thereby forming a plurality of strip-shaped resistive elements each having a first surface on which a plurality of cut-pieces of belt-shaped electrodes are formed and a second surface opposite to the first surface. On the other hand, a metal paste containing a glass frit is printed on a plurality of belt-shaped parts spaced apart from one another on a surface of a plate-shaped insulating substrate to form a plurality of adhesive layers spaced apart from one another. Then, the second surfaces of the strip-shaped resistive elements are applied to the plurality of adhesive layers, respectively, thereby forming a laminated body, and this laminated body is fired. Then, the plate-shaped insulating substrate to which the plurality of strip-shaped resistive elements have adhered is divided into pieces.

A resistor manufactured in this method has an insulating substrate, an adhesive layer, and a resistive element. The adhesive layer is formed on the insulating substrate, and contains a glass fused with the insulating substrate and the resistive element, and metal particles dispersed in the glass. The resistive element has a first surface having formed thereon a printed electrode and a second surface opposite to the first surface, and is fixed to the insulating substrate at the second surface via the adhesive layer.

In a second method of manufacturing a resistor according to the present invention, a plurality of belt-shaped electrodes are formed on a surface of a sheet-shaped resistive element and the sheet-shaped resistive element is cut to form a plurality of strip-shaped resistive elements in the same way as the first manufacturing method. On the other hand, an adhesive is printed on a plurality of belt-shaped parts spaced apart from one another on a surface of a plate-shaped insulating substrate to form a plurality of adhesive layers spaced apart from one another. Then, the second surfaces of the strip-shaped resistive elements are applied to the plurality of adhesive layers, respectively. Then, the plate-shaped insulating substrate to which the plurality of strip-shaped resistive elements have adhered is divided into pieces.

A resistor manufactured in this method has an insulating substrate, an adhesive layer, and a resistive element. The adhesive layer is formed on the insulating substrate, and is composed of a hardened adhesive. The resistive element has a first surface having formed thereon a printed electrode and a second surface opposite to the first surface, and is fixed to the insulating substrate at the second surface via the adhesive layer.

In a third method of manufacturing a resistor according to the present invention, a metal paste containing a glass frit is printed on a plurality of belt-shaped parts spaced apart from one another on a surface of a plate-shaped insulating substrate, thereby forming a plurality of adhesive layers. Next, a plurality of belt-shaped resistive elements composed of a metal are applied to each of the plurality of adhesive layers, thereby forming a laminated body, and the laminated body is fired. Then, the plate-shaped insulating substrate is divided into pieces.

A resistor manufactured in this method has an insulating substrate, an adhesive layer, and a resistive element. The adhesive layer is printed on the insulating substrate, and contains a glass, and metal particles dispersed in the glass, thereby functions as an electrode. The resistive element is fixed to the insulating substrate via the adhesive layer.

In either of the above-described configuration, a resistor according to the present invention has a relatively high resistance value for a resistor containing a metal. Also, this resistor can be easily manufactured by a manufacturing method according to the present invention.

DESCRIPTION OF EMBODIMENTS

Figure 11A:
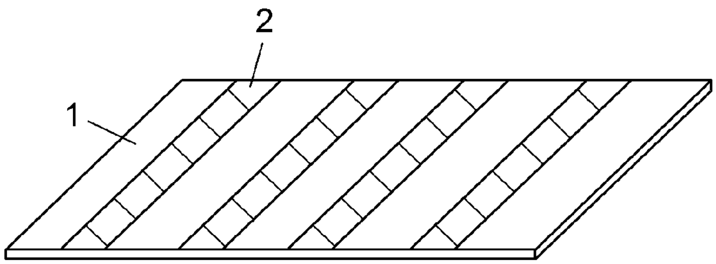
FIG. 11A PRIOR ART
FIG. 11A is a perspective view showing a conventional method of manufacturing a resistor.
Figure 11B:
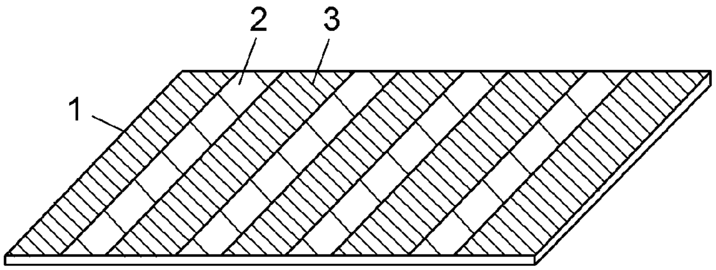
FIG. 11B PRIOR ART
FIG. 11B is a perspective view showing the conventional method of manufacturing a resistor.

Prior to describing exemplary embodiments of the present invention, problems of the conventional method of manufacturing the resistor described with reference to FIG. 11A and FIG. 11B will be described. In order to obtain a relatively high resistance value in a range of 10 mΩ to 20 mΩ in this manufacturing method, it is necessary to reduce the thickness of sheet-shaped resistive element 1. However, since reduction in thickness of sheet-shaped resistive element 1 results in reduction in stiffness of resistive element 1, handling of resistive element 1 when being transferred in the manufacturing process becomes difficult. As a result, it is difficult to produce a resistor having a relatively high resistance value.

Hereinafter, methods of manufacturing a resistor in accordance with exemplary embodiments of the present invention, which can solve the above problems and can easily produce a resistor having a relatively high resistance value, will be described with reference to the drawings. In each exemplary embodiment, the same components as those in a previous exemplary embodiment will be indicated by the same reference marks, and detailed description of them may occasionally be omitted.

First Exemplary Embodiment

Figure 1A:
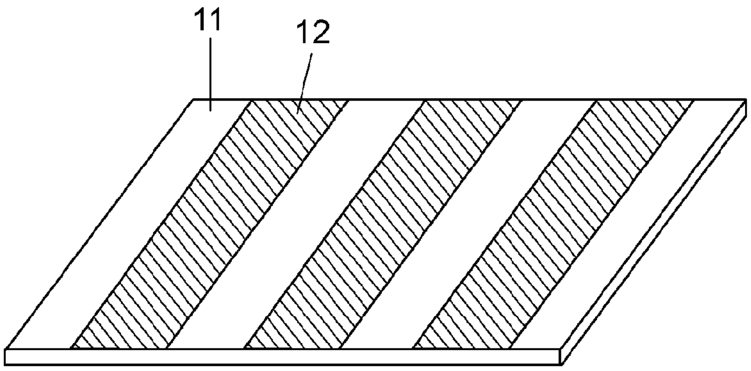
FIG. 1A is a perspective view showing a process of forming belt-shaped electrodes in a method of manufacturing a resistor in accordance with first and second exemplary embodiments of the present invention.
Figure 1B:
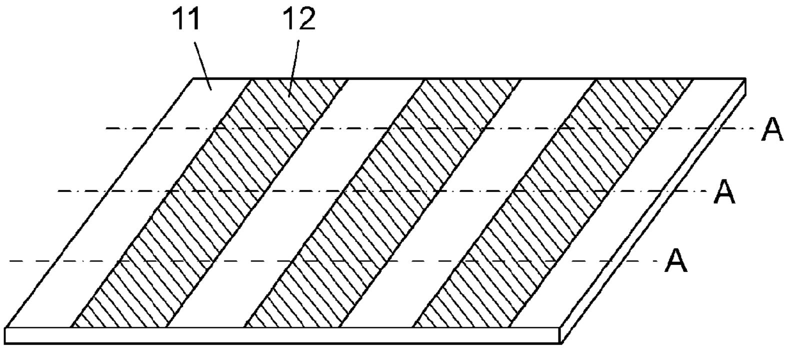
FIG. 1B is a perspective view showing a process of forming strip-shaped resistive elements in the method of manufacturing a resistor in accordance with the first and second exemplary embodiments of the present invention.
Figure 1C:
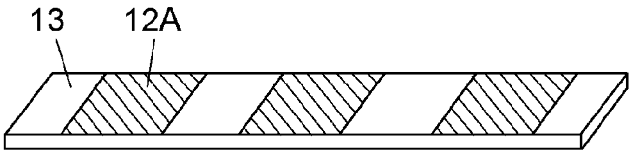
FIG. 1C is a perspective view of a strip-shaped resistive element obtained by the process shown in FIG. 1B.
Figure 1D:
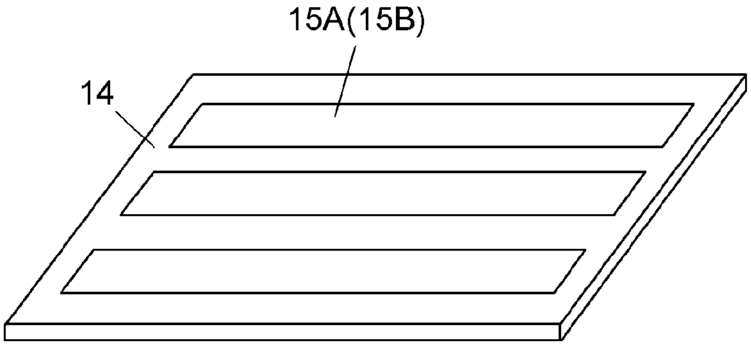
FIG. 1D is a perspective view showing a process of forming adhesive layers in the method of manufacturing a resistor in accordance with the first and second exemplary embodiments of the present invention.

FIGS. 1A and 1B are a perspective view showing a process of forming belt-shaped electrodes 12 and a perspective view showing a process of cutting sheet-shaped resistive element 11, respectively, in a method of manufacturing a resistor in accordance with a first exemplary embodiment of the present invention. FIG. 1C is a perspective view of strip-shaped resistive element 13 produced by the process shown in FIG. 1B. FIG. 1D is a perspective view showing a process of forming adhesive layers 15A on plate-shaped insulating substrate 14.

First, sheet-shaped resistive element 11 shown in FIG. 1A is prepared. Sheet-shaped resistive element 11 is produced by forming a metal such as CuNi, NiCr, CuMn and CuMnNi into a plate or a foil. As described later, sheet-shaped resistive element 11 will be cut into pieces and become resistive elements of a plurality of resistors, which are finished products.

Then, a metal paste which contains Cu or Ag, as a main constituent, and does not contain a glass frit is printed in a pattern of belts spaced apart from one another at regular intervals on a surface of sheet-shaped resistive element 11. Next, this metal paste is fired in a nitrogen atmosphere to form a plurality of belt-shaped electrodes 12. In other words, a metal paste is printed on a plurality of belt-shaped parts spaced apart from one another on a surface of sheet-shaped resistive element 11, and fired to form a plurality of belt-shaped electrodes 12 spaced apart from one another.

It is preferable that belt-shaped electrodes 12 contain a part of materials composing sheet-shaped resistive element 11. For example, in a case that sheet-shaped resistive element 11 is formed by an alloy containing Cu such as CuNi and CuMn, it is preferable that belt-shaped electrodes 12 contain Cu as a main constituent without containing a glass.

If belt-shaped electrodes 12 contain a part of materials of sheet-shaped resistive element 11, Cu in the metal paste and Cu in the alloy composing sheet-shaped resistive element 11 will melt together. As a result, Cu of belt-shaped electrodes 12 and Cu of sheet-shaped resistive element 11 join at the part they are contacting each other, so that belt-shaped electrodes 12 and sheet-shaped resistive element 11 join firmly.

In a case that sheet-shaped resistive element 11 is composed of an alloy containing Cu as a main constituent, belt-shaped electrodes 12 may be formed by firing an Ag paste. In this case also, since Cu and Ag form an alloy, sheet-shaped resistive element 11 and belt-shaped electrodes 12 join excellently. In this manner, a material composing sheet-shaped resistive element 11 and a material composing belt-shaped electrodes 12 may be selected so that the both materials form an alloy. Incidentally, since the metal paste for forming belt-shaped electrodes 12 does not contain a glass frit, resistivity of belt-shaped electrodes 12 is low. Also, sheet-shaped resistive element 11 may be configured by a metal foil, which cannot support itself. If sheet-shaped resistive element 11 is formed by a CuMnNi alloy, mass ratio of Cu:Mn:Ni may be about 84:12:4.

Meanwhile, before forming the plurality of belt-shaped electrodes 12, a meal paste containing Cu as a main constituent and a glass frit may be printed on specific parts on a back surface of sheet-shaped resistive element 11, and fired to form opposite surface electrodes (not shown).

Next, as shown in FIG. 1B, sheet-shaped resistive element 11 on which belt-shaped electrodes 12 is formed is cut by a dicing machine or a laser beam along lines A perpendicular to the plurality of belt-shaped electrodes 12. In this process, a plurality of strip-shaped resistive elements 13 are formed. One of strip-shaped resistive elements 13 is shown in FIG. 1C. Electrodes 12A formed by dividing belt-shaped electrodes 12 are disposed at regular intervals on an upper surface (a first surface) of each of strip-shaped resistive elements 13. In other words, sheet-shaped resistive element 11 on which the plurality of belt-shaped electrodes 12 is formed is cut in a direction crossing the plurality of belt-shaped electrodes 12. Products formed in this manner are the plurality of strip-shaped resistive elements 13 each having a first surface and a second surface opposite to the first surface. On the first surface, electrodes 12A are formed. Electrodes 12A are cut-pieces of the plurality of belt-shaped electrodes 12.

Next, as shown in FIG. 1D, a Cu paste containing a glass frit is printed at regular intervals on a flat surface of plate-shaped insulating substrate 14 composed of, for example, alumina. In other words, a metal paste containing a glass frit is printed on a plurality of belt-shaped parts spaced apart from one another on a surface of plate-shaped insulating substrate 14 to form a plurality of adhesive layers 15A which are spaced apart from one another.

Figure 2A:
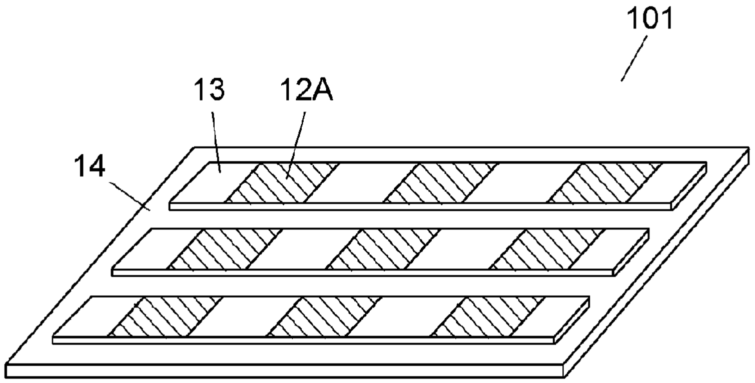
FIG. 2A is a perspective view showing a process of placing the strip-shaped resistive elements on a plate-shaped insulating substrate in the method of manufacturing a resistor in accordance with the first and second exemplary embodiments of the present invention.
Figure 2B:
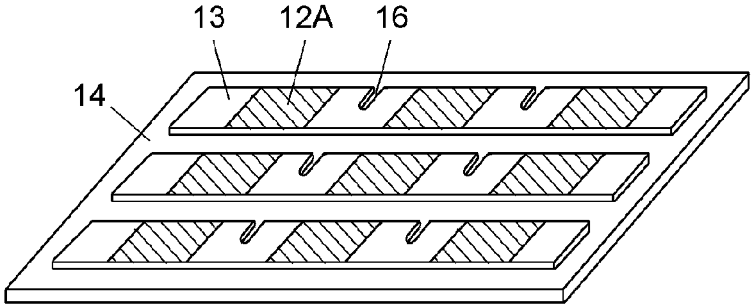
FIG. 2B is a perspective view showing a process of correcting resistance values in the method of manufacturing a resistor in accordance with the first and second exemplary embodiments of the present invention.
Figure 2C:
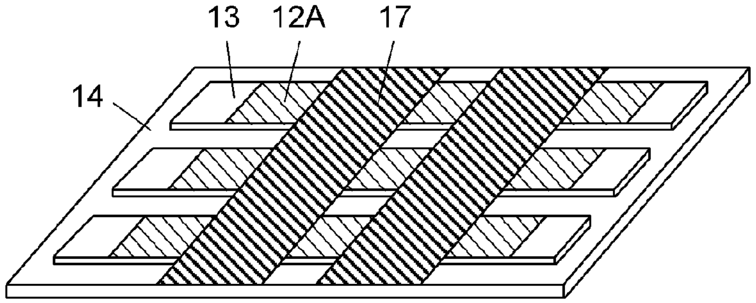
FIG. 2C is a perspective view showing a process of forming protective films in the method of manufacturing a resistor in accordance with the first and second exemplary embodiments of the present invention.
Figure 2D:
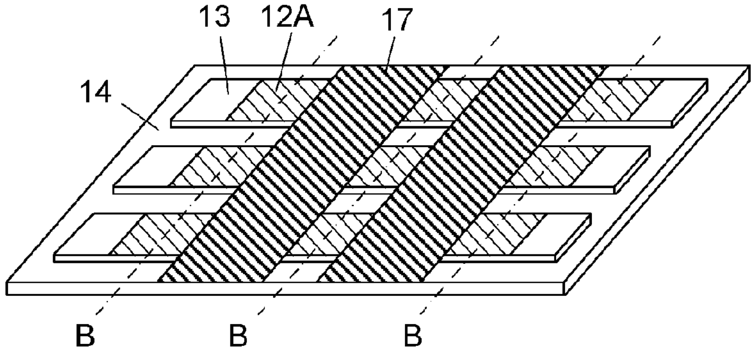
FIG. 2D is a perspective view showing a process of forming belt-shaped insulating substrates in the method of manufacturing a resistor in accordance with the first and second exemplary embodiments of the present invention.
Figure 3A:
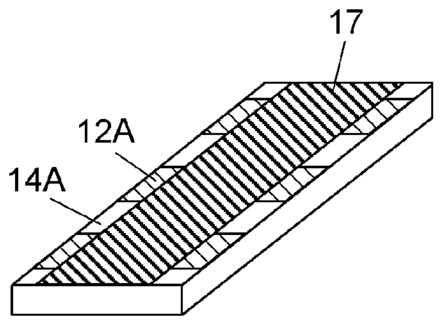
FIG. 3A is a perspective view of a belt-shaped insulating substrate obtained by the process shown in FIG. 2D.

FIG. 2A is a perspective view showing a process of placing strip-shaped resistive elements 13 on plate-shaped insulating substrate 14 in the method of manufacturing a resistor in accordance with the present exemplary embodiment. FIG. 2B is a perspective view showing a process of correcting resistance values. FIG. 2C is a perspective view showing a process of forming protective films 17. FIG. 2D is a perspective view showing a process of cutting plate-shaped insulating substrate 14. FIG. 3A is a perspective view of belt-shaped insulating substrate 14A produced by the process shown in FIG. 2D.

Next, as shown in FIG. 2A, strip-shaped resistive elements 13 are placed on insulating layers 15A formed on the surface of plate-shaped insulating substrate 14 so that electrodes 12A face upward. Then, plate-shaped insulating substrate 14 is fired in a nitrogen atmosphere so that strip-shaped resistive element 13 is fixed to plate-shaped insulating substrate 14 via adhesive layers 15A. In other words, the respective second surfaces of strip-shaped resistive elements 13 are applied to the plurality of adhesive layers 15A, respectively, thereby forming laminated body 101, and then laminated body 101 is fired.

It is preferable that plate-shaped insulating substrate 14 is composed of alumina. Since adhesive layers 15A contain a glass frit, adhesive layers 15A excellently adhere to plate-shaped insulating substrate 14 by being fired. Accordingly, strip-shaped resistive elements 13 are easily fixed to plate-shaped insulating substrate 14. Here, oxygen concentration in the nitrogen atmosphere during firing may be 12 ppm or lower.

Next, as shown in FIG. 2B, while resistance value of each part between adjacent two electrodes 12A on each of strip-shaped resistive elements 13 is measured, trimming groove 16 is formed on the each part so that the resistance value becomes a predetermined resistance value. The above-mentioned part will become resistive element 21 of a resistor as a finished product. The resistance value is corrected in this manner. By forming each trimming groove 16 to obtain the predetermined resistance value after firing in this manner, the resistance value can be precisely corrected.

Next, as shown in FIG. 2C, an epoxy resin is applied so as to cover each part between adjacent two electrodes 12A and a part of each electrode 12A, and hardened to form a plurality of belt-shaped protective films 17. Each of protective films 17 is formed across a plurality of strip-shaped resistive elements 13.

Next, as shown in FIG. 2D, plate-shaped insulating substrate 14 is cut by a dicing machine or a laser beam along lines B perpendicular to strip-shaped resistive elements 13 and passing through the respective centers of electrodes 12A which are uncovered with protective films 17. In this process, a plurality of belt-shaped insulating substrates 14A each being as shown in FIG. 3A are produced. Each of belt-shaped insulating substrates 14A will be further cut as described later. As a result, a resistor as a finished product has a single resistive element 21 and electrodes 12A formed on both ends of resistive element 21.

Incidentally, it is preferable to form in advance a dividing slit on plate-shaped insulating substrate 14 between each adjacent strip-shaped resistive elements 13 in the state of FIG. 2A. This allows plate-shaped insulating substrate 14 to be easily divided into pieces by being broken along the slit without using a dicing machine or a laser beam in the process of dividing plate-shaped insulating substrate 14 into pieces as shown in FIG. 2D.

Figure 3B:
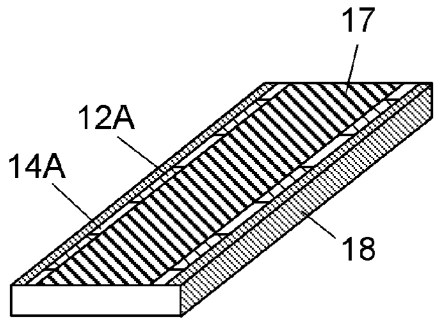
FIG. 3B is a perspective view showing a process of forming end surface electrodes in the method of manufacturing a resistor in accordance with the first and second exemplary embodiments of the present invention.
Figure 3C:
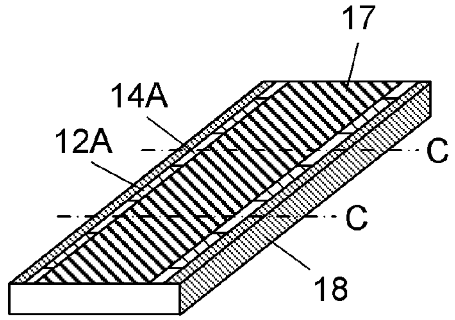
FIG. 3C is a perspective view showing a process of dividing the belt-shaped insulating substrate into pieces in the method of manufacturing a resistor in accordance with the first and second exemplary embodiments of the present invention.
Figure 3D:
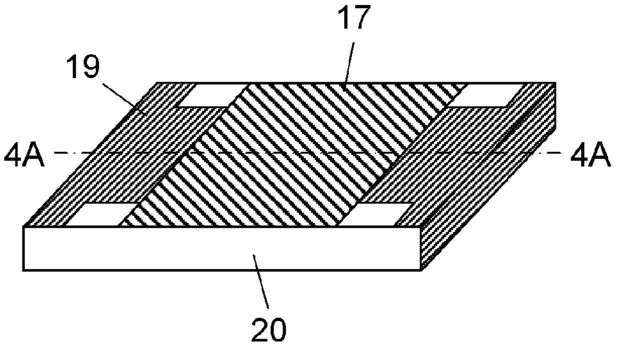
FIG. 3D is a perspective view showing a process of forming plated layers in the method of manufacturing a resistor in accordance with the first and second exemplary embodiments of the present invention.

FIG. 3B is a perspective view showing a process of forming end surface electrodes 18 on belt-shaped insulating substrate 14A in the method of manufacturing a resistor in accordance with the present exemplary embodiment. FIG. 3C is a perspective view showing a process of cutting belt-shaped insulating substrate 14A into pieces. FIG. 3D is a perspective view showing a process of forming plated layers 19.

On belt-shaped insulating substrate 14A shown in FIG. 3A, end surface electrodes 18 are formed at both ends at which electrodes 12A have been formed as shown in FIG. 3B. End surface electrodes 18 may be formed by printing and hardening an Ag paste or by sputtering NiCr, Cr or Ni.

Next, as shown in FIG. 3C, each belt-shaped insulating substrate 14A is cut, by a dicing machine or a laser beam along lines C each being perpendicular to protective film 17 and between adjacent two electrodes 12A, into pieces. FIG. 3D shows one of the pieces. In other words, through the process shown in FIG. 2D and the process shown in FIG. 3C, plate-shaped insulating substrate 14 to which a plurality of strip-shaped resistive elements 13 is fixed is divided into pieces. After each belt-shaped insulating substrate 14A has been divided into pieces, surfaces of end surface electrodes 18 are plated with copper, nickel and tin in this order so as to form plating layers 19.

Figure 4A:
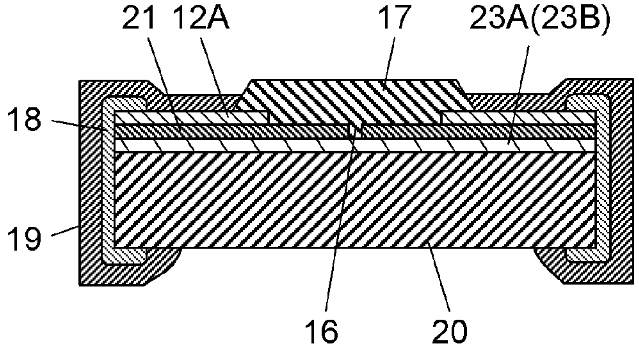
FIG. 4A is a sectional view of a resistor in accordance with the first and second exemplary embodiments of the present invention.
Figure 4B:
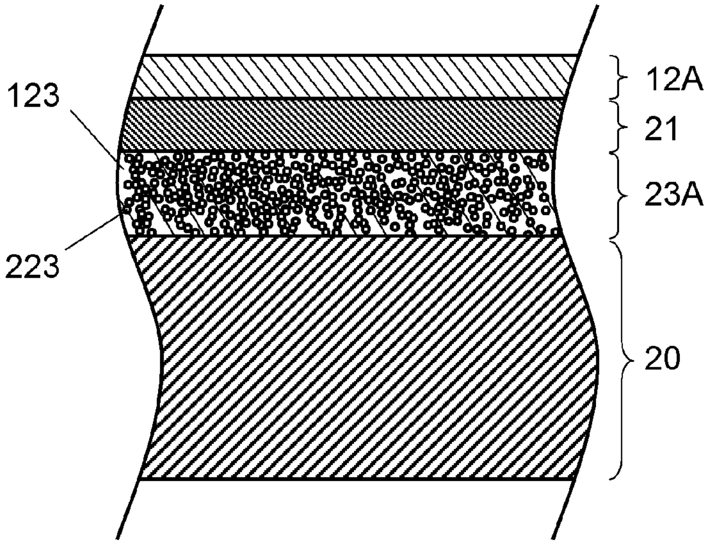
FIG. 4B is an enlarged sectional view of the resistor in accordance with the first exemplary embodiment of the present invention.

FIG. 4A is a sectional view of a resistor in accordance with the present exemplary embodiment, and shows a cross-section along line 4A-4A shown in FIG. 3D. FIG. 4B is an enlarged sectional view of the resistor in accordance with the present exemplary embodiment. This resistor has insulating substrate 20, adhesive layer 23A, resistive element 21, and printed electrodes 12A. Adhesive layer 23A is formed on insulating substrate 20. Adhesive layer 23A contains glass 123 fused to insulating substrate 20 and resistive element 21, and metal particles 223 dispersed in glass 123. Resistive element 21 has a first surface and a second surface opposite to the first surface, and is fixed to the insulating substrate at the second surface via the adhesive layer. Printed electrodes 12A are formed on the first surface of resistive element 21. In other words, resistive element 21, solely provided in each of the pieces, is placed on insulating substrate 20 via adhesive layer 15A. Electrodes 12A are formed on both ends of an upper surface of resistive element 21.

Through the processes as described above, plate-shaped insulating substrate 14 and each belt-shaped insulating substrate 14A are divided into pieces to become insulating substrates 20. Each adhesive layer 15A is divided into pieces to become adhesive layers 23A. Sheet-shaped resistive element 11 is divided into pieces to become resistive elements 21. Each resistive element 21 is provided with trimming groove 16, which is a cutout portion.

The resistor further has protective film 17, end surface electrodes 18, and plated layers 19. Protective film 17 is formed so as to cover resistive element 21 and a part of each electrode 12A. End surface electrodes 18 are disposed at both ends of insulating substrate 20. Furthermore, end surface electrodes 18 are connected to electrodes 12A and resistive element 21. Plated layers 19 are provided on surfaces of end surface electrodes 18.

In the method of manufacturing a resistor in accordance with the present exemplary embodiment, strip-shaped resistive elements 13 formed by cutting sheet-shaped resistive element 11 are fixed to plate-shaped insulating substrate 14 with adhesive layers 15A therebetween. Accordingly, even if sheet-shaped resistive element 11 is made thin for producing a resistor having a relatively high resistance value, strip-shaped resistive elements 13 can be supported by plate-shaped insulating substrate 14. Each strip-shaped resistive element 13 supported by plate-shaped insulating substrate 14, which is higher in rigidity than a strip-shaped resistive element which is not supported by plate-shaped insulating substrate 14, can be handled easily when it is transferred in the manufacturing process. As a result, even if resistor 21 is formed of a metal plate, it is possible to easily produce a resistor having a relatively high resistance value of 10 mΩ to 20 mΩ.

Furthermore, since electrodes 12A can be formed by a printing method which is used for producing the ordinary chip resistors and electrodes 12A can be subjected to trimming in a state they are fixed to plate-shaped insulating substrate 14, it is possible to improve man-hour and to reduce cost.

Further, use of plate-shaped insulating substrate 14 makes it possible to easily produce a small-size resistor which is 0.6 mm wide by 0.3 mm long.

Moreover, since adhesive layer 23A contains a metal, heat generated at resistive element 21 can be efficiently dissipated to insulating substrate 20. Accordingly, the resistor can be used as a high-power resistor. In the case that insulating substrate 20 is composed of alumina, the heat dissipation capability is further improved.

In other words, it is possible not only to allow sheet-shaped resistive element 11 to be easily handled during its transfer in the manufacturing processes, but also to realize a smaller size and higher power resistor at low cost. Also, the resistors can be mounted in the same way as the ordinary chip resistors. Meanwhile, if a low resistance value is required, the thickness of sheet-shaped resistive element 11 may be increased or the distance between each adjacent two electrodes 12A may be reduced.

Figure 5:
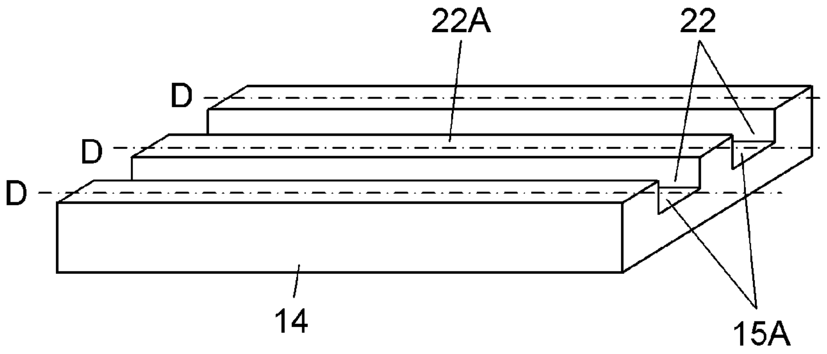
FIG. 5 is a perspective view showing another method of manufacturing a resistor in accordance with the first exemplary embodiment of the present invention.

FIG. 5 is a perspective view showing a method of manufacturing another resistor in accordance with the present exemplary embodiment. In the resistor manufacturing method shown in FIG. 1A to FIG. 3D, strip-shaped resistive elements 13 are fixed to plate-shaped insulating substrate 14 having a flat surface. On the other hand, in the resistor manufacturing method shown in FIG. 5, a plurality of recessed parts 22 are provided on the surface of plate-shaped insulating substrate 14 so as to be spaced apart from one another. A plurality of adhesive layers 15A are formed within the plurality of recessed parts 22, respectively. The plurality of recessed parts 22 may, for example, be provided at regular intervals.

Further, the second surfaces of strip-shaped resistive elements 13, on which belt-shaped electrodes 12 are not provided, are applied to bottom surfaces of the plurality of recessed parts 22, respectively, so that at least parts of strip-shaped resistive elements 13 are embedded in the plurality of recessed parts 22, respectively. When plate-shaped insulating substrate 14 are divided into pieces, plate-shaped insulating substrate 14 is cut at each protruded part 22A between each adjacent two recessed parts 22. For example, plate-shaped insulating substrate 14 may be cut along the respective center lines of protruded parts 22A (lines D).

Figure 6:
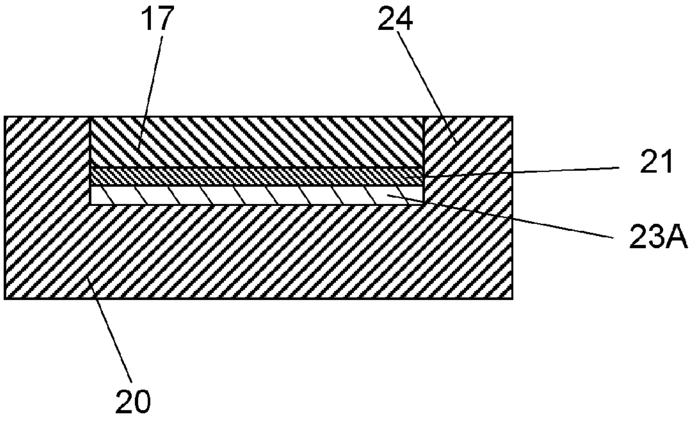
FIG. 6 is a sectional view of a resistor obtained by the process shown in FIG. 5.

FIG. 6 is a sectional view seen from a side direction of a resistor produced in the above-described manner. A sectional view of this resistor seen from a front direction of FIG. 5 is the same as that shown in FIG. 4A.

The resistor shown in FIG. 6 has a high heat dissipation capability because resistive element 21 is surrounded by inner walls of the recessed part of insulating substrate 20 composed of a ceramic. Accordingly, the temperature of resistive element 21 is low, so that temperature rise of electrodes 12A can be suppressed. As a result, when this resistor is mounted on a circuit board, deterioration of solder for connecting electrodes 12A to the circuit board can be suppressed, so that stability of connection between the resistor and the circuit board can be improved.

Furthermore, upper surfaces of parts 24 formed by cutting part 22A shown in FIG. 5 and an upper surface of protective film 17 can be made to almost flush with each other. Accordingly, this resistor can be easily sucked by a suction nozzle (not shown) during a mounting process, so that workability of mounting resistors can be increased. Also, since parts 24 exist at the ends of protective film 17, the surface of protective film 17 can be easily made flat, and, in this respect also, mounting performance is increased.

Second Exemplary Embodiment

Next, a method of manufacturing a resistor in accordance with a second exemplary embodiment will be described. The resistor manufacturing method in accordance with the present exemplary embodiment is different from the resistor manufacturing method in accordance with the first exemplary embodiment in the materials of the adhesive layer. Others than this point are basically the same as those of the first exemplary embodiment. Accordingly, FIG. 1A, FIG. 1B, FIG. 1C, FIG. 1D, FIG. 2A, FIG. 2B, FIG. 2C, FIG. 2D, FIG. 3A, FIG. 3B, FIG. 3C and FIG. 3D can be applied to the method of manufacturing a resistor in accordance with the second exemplary embodiment. The resistor manufacturing method in accordance with the present exemplary embodiment is the same as the resistor manufacturing method in accordance with the first exemplary embodiment in the processes before the process of forming the adhesive layers.

That is, a metal paste is printed on a plurality of belt-shaped parts spaced apart from one another on a surface of sheet-shaped resistive element 1 composed of a metal, and fired to form a plurality of belt-shaped electrodes 12 spaced apart from one another. Then, sheet-shaped resistive element 1 on which the plurality of belt-shaped electrodes 12 is formed is cut in a direction crossing the plurality of belt-shaped electrodes 12. Products formed in this manner are a plurality of strip-shaped resistive elements 13 each having a first surface and a second surface opposite to the first surface. On the first surface, electrodes 12A are formed. Electrodes 12A are cut-pieces of the plurality of belt-shaped electrodes 12.

In the process shown in FIG. 1D, according to the present exemplary embodiment, a plurality of adhesive layers 15B are formed on a flat surface of plate-shaped insulating substrate 14 in place of adhesive layers 15A. In other words, an adhesive is printed on a plurality of belt-shaped parts spaced apart from one another on a surface of plate-shaped insulating substrate 14 to form the plurality of adhesive layers 15B spaced apart from one another.

Next, as shown FIG. 2A, strip-shaped resistive elements 13 obtained in the process shown in FIG. 1C are placed on adhesive layers 15B formed on the surface of plate-shaped insulating substrate 14 so that electrodes 12A face upward. Then, adhesive layers 15B are hardened to allow strip-shaped resistive elements 13 to be fixed to plate-shaped insulating substrate 14 via adhesive layers 15B. In other words, the respective second surfaces of strip-shaped resistive elements 13 are fixed to the plurality of adhesive layers 15B, respectively.

Subsequent processes in accordance with the present exemplary embodiment are the same as those of the first exemplary embodiment. Meanwhile, strip-shaped resistive elements 13 are fixed to plate-shaped insulating substrate 14 with adhesive layers 15A therebetween by firing laminated body 101 in the first exemplary embodiment. Firing laminated body 101 in this manner may sometimes cause variations in resistance value. According to the present embodiment, on the other hand, firing will not be carried out in the subsequent processes once strip-shaped resistive elements 13 are formed. Accordingly, trimming may be performed on strip-shaped resistive elements 13 in the state before being fixed to plate-shaped insulating substrate 14.

A sectional view of a resistor produced in the above-described processes is the same as that shown in FIG. 4A. The resistor in accordance with the present exemplary embodiment is different from the resistor of the first exemplary embodiment in that the resistor has adhesive layer 23B composed of a hardened adhesive in place of adhesive layer 23A.

Incidentally, if plate-shaped insulating substrate 14 is composed of a glass epoxy, it is possible to easily cut plate-shaped insulating substrate 14 with a cutter blade or the like without using a dicing machine or a laser beam when plate-shaped insulating substrate 14 is divided into belt-shaped insulating substrates 14A, and further divided into pieces of insulating substrates 20. Further, it is preferable that plate-shaped insulating substrate 14 (insulating substrate 20) is composed of a glass epoxy, and that the adhesive for forming adhesive layers 15B and adhesive layer 23B contains an epoxy resin. The similar resin contents in both plate-shaped insulating substrate 14 and adhesive layers 15B provide an excellent adherence of adhesive layers 15B to plate-shaped insulating substrate 14. Accordingly, strip-shaped resistive elements 13 can be easily fixed to plate-shaped insulating substrate 14.

Meanwhile, it is preferable that the second surface of each strip-shaped resistive element 13 is roughened in advance by, for example, sandblasting. This increases the contact area between the adhesive and strip-shaped resistive element 13, and eventually increases adhesion between resistive element 21 and insulating substrate 20 in a resistor as a finished product. This also allows the resistor to be tolerant of thermal expansion. It is efficient and preferable to roughen sheet-shaped resistive element 11 in advance.

According to the method of manufacturing a resistor in accordance with the present exemplary embodiment, similarly to the method of manufacturing a resistor in accordance with the first exemplary embodiment, the respective components can be handled easily when they are transferred in the manufacturing processes. Accordingly, the same advantageous effects as those of the first exemplary embodiment can be obtained.

Third Exemplary Embodiment

Figure 7A:
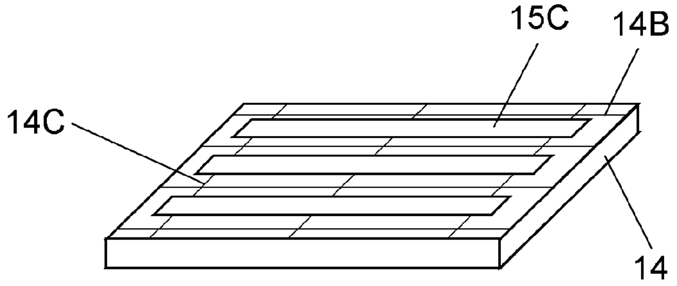
FIG. 7A is a perspective view showing a process of forming adhesive layers in a method of manufacturing a resistor in accordance with a third exemplary embodiment of the present invention.
Figure 7B:
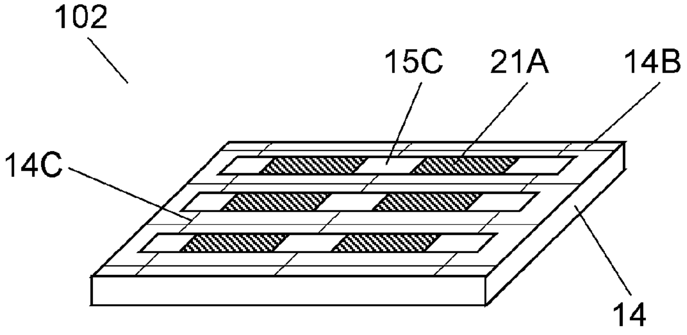
FIG. 7B is a perspective view showing a process of placing belt-shaped resistive elements in a method of manufacturing a resistor in accordance with the third exemplary embodiment of the present invention.
Figure 7C:
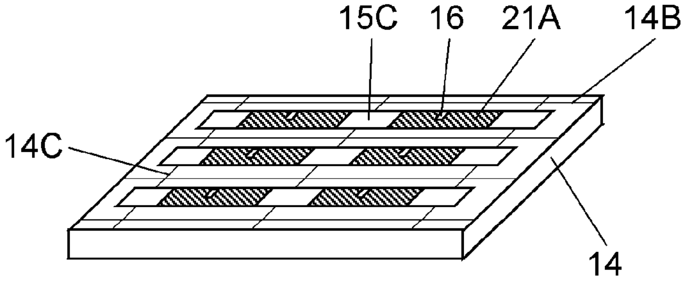
FIG. 7C is a perspective view showing a process of correcting resistance values in the method of manufacturing a resistor in accordance with the third exemplary embodiment of the present invention.
Figure 7D:
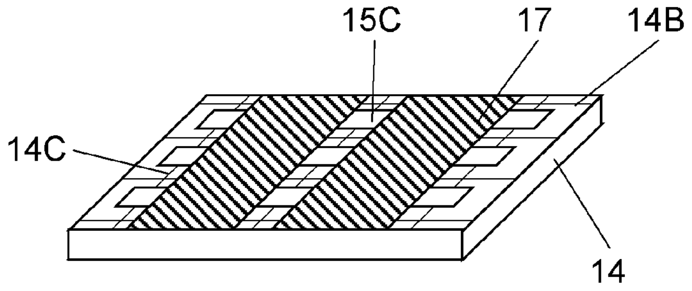
FIG. 7D is a perspective view showing a process of forming protective films in the method of manufacturing a resistor in accordance with the third exemplary embodiment of the present invention.

FIG. 7A is a perspective view showing a process of forming adhesive layers 15C on a surface of plate-shaped insulating substrate 14 in a method of manufacturing a resistor in accordance with a third exemplary embodiment of the present invention. FIG. 7B is a perspective view showing a process of placing belt-shaped resistive elements 21A (hereinafter referred to as "resistive elements") on adhesive layers 15C. FIG. 7C is a perspective view showing a process of correcting resistance values of resistive elements 21A. FIG. 7D is a perspective view showing a process of forming protective films 17.

First, as shown in FIG. 7A, plate-shaped insulating substrate 14 is prepared. It is preferable that insulating substrate 14 is provided with slits 14B and 14C in advance so that it can easily be divided later. On a surface of plate-shaped insulating substrate 14, a Cu paste containing a glass frit is printed in a pattern of belts arranged at regular intervals to form a plurality of adhesive layers 15C. In other words, a Cu paste containing a glass frit is printed on a plurality of belt-shaped parts spaced apart from one another on plate-shaped insulating substrate 14, thereby forming a plurality of adhesive layers 15C.

Since adhesive layers 15C contain a glass frit, adhesion of adhesive layers 15C to plate-shaped insulating substrate 14 may become excellent if plate-shaped insulating substrate 14 is composed of alumina. As can be understood, the process of forming adhesive layers 15C according to the present exemplary embodiment is the same as that of forming adhesive layers 15A according to the first exemplary embodiment. However, since adhesive layers 15C will function as electrodes, it is preferable that adhesive layers 15C has larger content of metal particle than adhesive layers 15A.

Next, as shown in FIG. 7B, resistive elements 21A are placed on adhesive layers 15C formed on insulating substrate 14. Resistive elements 21A are configured by forming a metal such as CuNi, NiCr, CuMn, and CuMnNi into a plate-shape or a foil. In other words, resistive elements 21 can be formed of the same materials as those of sheet-shaped resistive element 11 in the first exemplary embodiment. Also, each resistive element 21 may be formed of a meal foil, which cannot support itself.

Sheet-shaped resistive element 11 and strip-shaped resistive elements 13 according to the first exemplary embodiment are cut when they are divided into pieces each of which constitutes a resistor as the finished product. On the other hand, each of resistive elements 21A will be contained as it is in a resistor as the finished product. Accordingly, each of resistive elements 21A has a shape of a piece from the beginning.

After resistive elements 21A are placed on adhesive layers 15C, plate-shaped insulating substrate 14 is fired in a nitrogen atmosphere so that resistive elements 21A adheres to plate-shaped insulating substrate 14 via adhesive layers 15C. In other words, a plurality of resistive elements 21A composed of a metal are applied to each of a plurality of adhesive layers 15C so as to be spaced apart from one another, thereby forming laminated body 102, and then laminated body 102 is fired. Adhesive layers 15C are composed of a Cu paste containing a glass frit as described above. Accordingly, resistive elements 21A are easily fixed to plate-shaped insulating substrate 14 by firing. Here, oxygen concentration in the nitrogen atmosphere during firing may be 12 ppm or lower.

Next, as shown in FIG. 7C, resistance values of resistive elements 21A are corrected. In this correction process, while the resistance values of resistive elements 21A are measured, trimming grooves 16 are formed so that each of the resistance values becomes a predetermined resistance value. In this manner, by trimming resistive elements 21A so that each of their resistance values becomes a predetermined resistance value after laminated body 102 has been fired, the resistance values can be precisely corrected. The resistance value of each resistive element 21A can be measured by bringing measuring probes (not shown) into contact with portions of adhesive layers 15C at both ends of resistive element 21A. The portions of adhesive layer 15C contacted with the measuring probes are preferably such two portions that will not be covered with protective layer 17 formed in a later process and will be close to protective layer 17. Because, these portions will come into direct contact with plated layers 19 which will be described later, and a part between the portions will substantially function as a resistor.

Next, as shown in FIG. 7D, protective layers 17 are formed by using, for example, an epoxy resin so as to cover all of resistive elements 21A and a part of adhesive layers 15C.

After protective layers 17 are formed, the processes according to the first exemplary embodiments shown in FIG. 2D, FIG. 3B, FIG. 3C and FIG. 3D are carried out. That is, after laminated body 102 is fired, plate-shaped insulating substrate 14 is divided into pieces. Since plate-shaped insulating substrate 14 is provided with slits 14C, the process of producing belt-shaped insulating substrate 14A may be performed by applying a bending stress to plate-shaped insulating substrate 14 so as to divide plate-shaped insulating substrate 14 at slits 14C without applying a dicing method. Also, since plate-shaped insulating substrate 14 is provided with slits 14B, the process of dividing belt-shaped insulating substrate 14A into pieces may be performed by applying a bending stress to belt-shaped insulating substrate 14A so as to divide belt-shaped insulating substrate 14A at slits 14B. These processes can be performed more easily and in a shorter time compared to the dicing method.

In the first exemplary embodiment, belt-shaped electrodes 12 are formed to bridge the dividing portions at which belt-shaped insulating substrate 14A is divided into pieces. According to the present exemplary embodiment, on the other hand, pieces of resistive elements 21A are used from the beginning. Accordingly, it is possible to use the method of dividing belt-shaped insulating substrate 14A by applying a bending stress.

Figure 8:
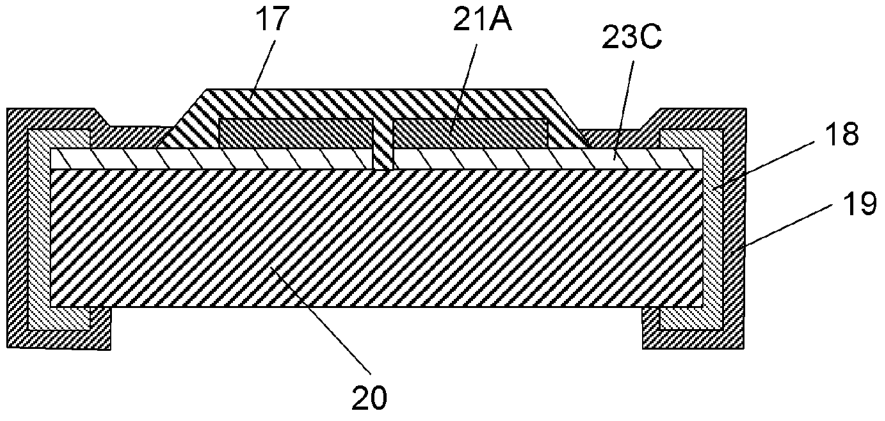
FIG. 8 is a sectional view of a resistor in accordance with the third exemplary embodiment of the present invention.

FIG. 8 is a sectional view of a resistor in accordance with the present exemplary embodiment. This resistor is produced by the processes as described above. A piece of insulating substrate 20 can be obtained by dividing plate-shaped insulating substrate 14 into belt-shaped insulating substrate 14A, and then further dividing each of belt-shaped insulating substrate 14A. Adhesive layers 23C are printed on insulating substrate 20, and are obtained by dividing each of adhesive layers 15C. Resistive element 21A, which is solely provided on each cut-piece via adhesive layers 23C, is placed on insulating substrate 20. Protective film 17 is formed so as to cover resistive element 21A and a part of each of adhesive layers 23C. Protective film 17 contains a glass and metal particles dispersed in the glass, and functions as an electrode. End surface electrodes 18 are disposed on both ends of insulating substrate 20. Also, end surface electrodes 18 are connected to adhesive layers 23C, respectively. Plated layers 19 are provided on surfaces of end surface electrodes 18, respectively.

In the method of manufacturing a resistor in accordance with the present exemplary embodiment, resistive elements 21A are fixed to plate-shaped insulating substrate 14 with adhesive layers 15C therebetween. Accordingly, even if the thickness of resistive elements 21A is reduced to produce resistors having relatively high resistance values, resistive elements 21A can be supported by plate-shaped insulating substrate 14. Therefore, the same advantageous effects as those of the first exemplary embodiment can be obtained.

Furthermore, since adhesive layer 23C contains a metal, heat generated in resistive element 21A can be efficiently dissipated. This advantageous effect is also the same as that of the first exemplary embodiment.

Fourth Exemplary Embodiment

Figure 9A:
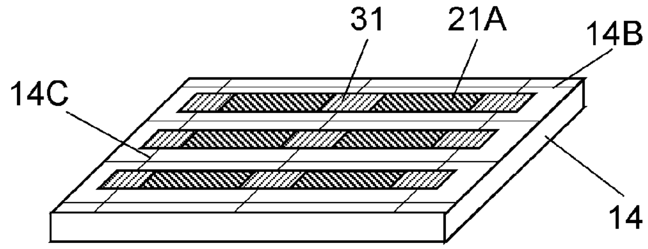
FIG. 9A is a perspective view showing a process of forming metal paste layers in a method of manufacturing a resistor in accordance with a fourth exemplary embodiment of the present invention.
Figure 9B:
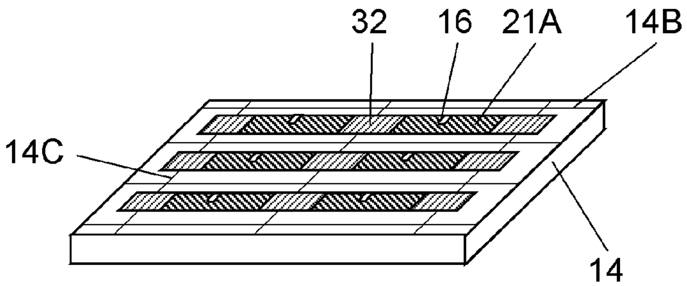
FIG. 9B is a perspective view showing a process of correcting resistance values in the method of manufacturing a resistor in accordance with the fourth exemplary embodiment of the present invention.
Figure 9C:
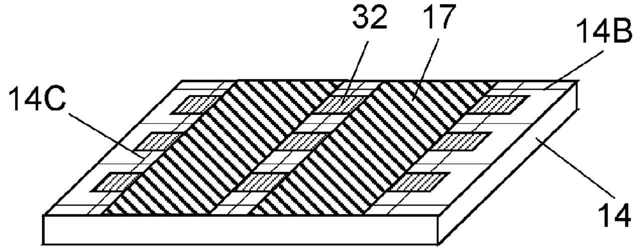
FIG. 9C is a perspective view showing a process of forming protective films in the method of manufacturing a resistor in accordance with the fourth exemplary embodiment of the present invention.

FIG. 9A is a perspective view showing a process of forming metal paste layers 31 in a method of manufacturing a resistor in accordance with a fourth exemplary embodiment of the present invention. FIG. 9B is a perspective view showing a process of correcting resistance values of belt-shaped resistive elements (hereinafter referred to as "resistive elements") 21A. FIG. 9C is a perspective view showing a process of forming protective films 17.

The resistor manufacturing method according to the present exemplary embodiment is partway the same as the resistor manufacturing method according to the third exemplary embodiment. Specifically, the resistor manufacturing method according to the present exemplary embodiment is the same as that of the third exemplary embodiment until the process of forming adhesive layers 15C shown in FIG. 7A and the process of placing resistive elements 21A on adhesive layers 15C shown in FIG. 7B are completed.

That is, resistive elements 21A are placed on adhesive layers 15C to form laminated body 102 as shown in FIG. 7B. Then, as shown in FIG. 9A, a metal paste is printed on exposed surfaces of the plurality of adhesive layers 15C, which are uncovered with resistive elements 21A, thereby forming metal paste layers 31 before firing laminated body 102.

Metal paste layers 31 are prepared by a Cu paste containing a glass frit. It is preferable that metal paste layers 31 contain about 3 wt % of glass frit. After metal paste layers 31 are formed, plate-shaped insulating substrate 14 is fired in a nitrogen atmosphere. Since adhesive layers 15C are composed of a Cu paste containing a glass frit, resistive elements 21A are easily fixed to plate-shaped insulating substrate 14 by firing. Oxygen concentration in the nitrogen atmosphere during firing may be 12 ppm or lower. Metal paste layers 31 are hardened by firing so as to become upper surface electrodes 32 shown in FIG. 9B. Incidentally, it is possible to fire laminated body 102 after resistive elements 21A are placed on adhesive layers 15C, and then form metal paste layers 31. In this case, however, additional firing process is necessary to form metal paste layers 31.

Next, as shown in FIG. 9B, resistance value measuring probes are brought into contact with upper surface electrodes 32 at both ends of each resistive element 21A, and trimming groove 16 is formed on each resistive element 21A so that a predetermined resistance value is obtained. In this manner, by performing the trimming for obtaining a predetermined resistance value after firing, the resistance value of each resistive element 21A can be precisely corrected.

Next, as shown in FIG. 9C, protective layers 17 are formed in a pattern of belts by using, for example, an epoxy resin so as to cover all of resistive elements 21A and a part of upper surface electrodes 32.

After protective layers 17 are formed, the processes shown in FIG. 2D, FIG. 3A, FIG. 3B, FIG. 3C and FIG. 3D and described in relation to the first exemplary embodiment are applied.

Figure 10:
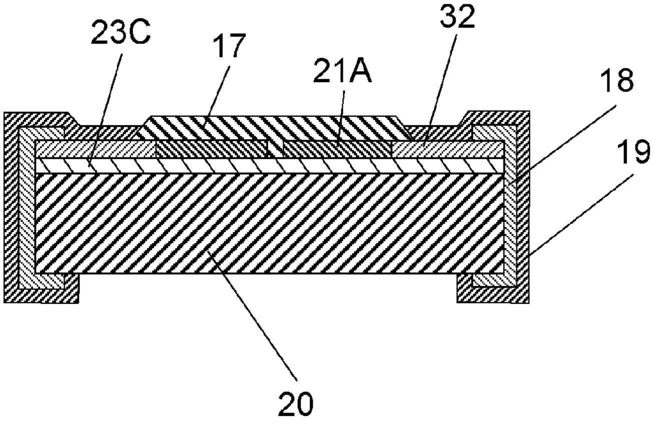
FIG. 10 is a sectional view of a resistor in accordance with the fourth exemplary embodiment of the present invention.

FIG. 10 is a sectional view of a resistor in accordance with the present exemplary embodiment. The resistor shown in FIG. 10 is produced by the processes as described above. The resistor has upper electrodes 32 in addition to the resistor shown in FIG. 8. That is, in the surface of each adhesive layer 23C, there are a part covered with and joined to resistive element 21A, and exposed parts uncovered with resistive element 21A. A pair of upper surface electrodes 32 are formed on the exposed parts of adhesive layer 23C by printing so as to be in direct contact with sides of each resistive element 21A. Upper surface electrodes 32 may be overlapped on resistive element 21A. Protective layer 17 covers entire resistive element 21A and a part of each upper surface electrode 32.

The method of manufacturing a resistor according to the present exemplary embodiment also provides the same advantageous effects as those of the third exemplary embodiment.

INDUSTRIAL APPLICABILITY

With methods of manufacturing a resistor according to the present invention, such a resistor can be easily obtained that has a relatively high resistance value among resistors each being formed of a metal resistive element. This resistor can be used particularly for current detection in various electronic devices.

REFERENCE MARKS IN THE DRAWINGS

11 sheet-shaped resistive element
12 belt-shaped electrode
12A electrode (printed electrode)
13 strip-shaped resistive element
14 plate-shaped insulating substrate
14A belt-shaped insulating substrate
14B, 14C slit
15A, 15B, 15C, 23A, 23B, 23C adhesive layer
16 trimming groove
17 protective film
18 end surface electrode
19 plated layer
20 insulating substrate
21 resistive element
21A belt-shaped resistive element (resistive element)
22 recessed part
22A, 24 part
31 metal paste layer
32 upper surface electrode
101, 102 laminated body
123 glass
223 metal particle

The invention claimed is:

1. A method of manufacturing a resistor comprising:
forming a plurality of belt-shaped electrodes spaced apart from one another by printing a metal paste on a plurality of belt-shaped parts spaced apart from one another on a surface of a sheet-shaped resistive element composed of a metal and by firing the metal paste;
cutting the sheet-shaped resistive element having formed thereon the plurality of belt-shaped electrodes in a direction crossing the plurality of belt-shaped electrodes, thereby forming a plurality of strip-shaped resistive elements each having a first surface on which cut-pieces of the plurality of belt-shaped electrodes are formed and a second surface opposite to the first surface;
forming a plurality of adhesive layers spaced apart from one another by printing a metal paste containing a glass frit on a plurality of belt-shaped parts spaced apart from one another on a surface of a plate-shaped insulating substrate;
applying the second surfaces of the plurality of strip-shaped resistive elements to the plurality of adhesive layers, respectively, thereby forming a laminated body, and then firing the laminated body; and
dividing the plate-shaped insulating substrate to which the plurality of strip-shaped resistive elements has adhered, into pieces.

2. The method according to claim 1, wherein the plate-shaped insulating substrate is composed of alumina.

3. The method according to claim 1,
wherein the plate-shaped insulating substrate is provided on the surface thereof with a plurality of belt-shaped recessed parts spaced apart from one another,
when forming the plurality of adhesive layers, the plurality of adhesive layers are formed within the plurality of belt-shaped recessed parts, respectively;
when applying the plurality of strip-shaped resistive elements to the plurality of adhesive layers, the second surfaces of the plurality of strip-shaped resistive elements are applied to bottom surfaces of the plurality of belt-shaped recessed parts, respectively, so that at least parts of the plurality of strip-shaped resistive elements are embedded in the plurality of belt-shaped recessed parts, respectively; and when dividing the plate-shaped insulating substrate into pieces, the plate-shaped insulating substrate is cut at protruded parts between each adjacent two of the plurality of belt-shaped recessed parts.

4. The method according to claim 1, further comprising, after applying the plurality of strip-shaped resistive elements to the plurality of adhesive layers and before dividing the plate-shaped insulating substrate, trimming each of the plurality of strip-shaped resistive elements while measuring a resistance value between each adjacent two of the cut-pieces of the plurality of belt-shaped electrodes so that the resistance value becomes a predetermined resistance value.

5. A method of manufacturing a resistor comprising:

forming a plurality of belt-shaped electrodes spaced apart from one another by printing a metal paste on a plurality of belt-shaped parts spaced apart from one another on a surface of a sheet-shaped resistive element composed of a metal and by firing the metal paste;

cutting the sheet-shaped resistive element having formed thereon the plurality of belt-shaped electrodes in a direction crossing the plurality of belt-shaped electrodes, thereby forming a plurality of strip-shaped resistive elements each having a first surface on which cut-pieces of the plurality of belt-shaped electrodes are formed and a second surface opposite to the first surface;

forming a plurality of adhesive layers spaced apart from one another by printing an adhesive on a plurality of belt-shaped parts spaced apart from one another on a surface of a plate-shaped insulating substrate;

applying the second surfaces of the plurality of strip-shaped resistive elements to the plurality of adhesive layers, respectively; and dividing the plate-shaped insulating substrate to which the plurality of strip-shaped resistive elements has adhered, into pieces.

6. The method according to claim 5, wherein the plate-shaped insulating substrate is composed of a glass epoxy.

7. The method according to claim 6, wherein the adhesive contains an epoxy resin.

8. The method according to claim 5, wherein the second surface of each of the plurality of strip-shaped resistive elements is roughened.

9. The method according to claim 1, wherein the plurality of belt-shaped electrodes contain a part of materials composing the sheet-shaped resistive element.

10. The method according to claim 5, wherein the plurality of belt-shaped electrodes contain a part of materials composing the sheet-shaped resistive element.

11. The method according to claim 1, wherein a wt % of the glass frit contained in the metal paste is less than a wt % of a metal contained in the metal paste.

12. The method according to claim 11, wherein the metal paste contains about 3 wt % of the glass frit.

13. The method according to claim 1, further comprising, after dividing the plate-shaped insulating substrate, forming end surface electrodes at respective ends of the plate-shaped insulating substrate.

14. The method according to claim 5, further comprising, after dividing the plate-shaped insulating substrate, forming end surface electrodes at respective ends of the plate-shaped insulating substrate.

* * * * *